(12) United States Patent
Ishihara

(10) Patent No.: US 6,700,596 B2
(45) Date of Patent: Mar. 2, 2004

(54) SCANNING OPTICAL ELEMENT WITH LIGHT-BEAM PASSAGE

(75) Inventor: Keiichiro Ishihara, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/905,951

(22) Filed: Jul. 17, 2001

(65) Prior Publication Data

US 2002/0021346 A1 Feb. 21, 2002

(30) Foreign Application Priority Data

Jul. 17, 2000 (JP) .......................... 2000-216164
Jul. 2, 2001 (JP) .......................... 2001-200587

(51) Int. Cl.⁷ ............................................. G02B 26/10
(52) U.S. Cl. .................. 347/134; 347/250; 347/259; 359/205
(58) Field of Search ................. 347/134, 137, 347/129, 235, 250, 256, 258, 259; 359/205, 206

(56) References Cited

U.S. PATENT DOCUMENTS 5,771,115 A * 6/1998 Takanashi ................. 359/205

FOREIGN PATENT DOCUMENTS

| JP | 6-3610 | | 1/1994 |
|---|---|---|---|
| JP | 8-43754 A | * | 2/1996 |
| JP | 9-184990 A | * | 7/1997 |
| JP | 11-190823 | | 7/1999 |
| JP | 11-223789 | | 8/1999 |
| JP | 11-231235 A | * | 8/1999 |
| JP | 11-311749 | | 11/1999 |
| JP | 2000-267036 | | 9/2000 |

* cited by examiner

*Primary Examiner*—Joan Pendegrass
(74) *Attorney, Agent, or Firm*—Fitzpatrick, Cella, Harper & Scinto

(57) ABSTRACT

An optical scanning apparatus includes a light source, a deflector with a deflecting/reflecting surface which deflects an incident light beam from the light source, an imaging optical system including at least one scanning optical element for leading the light beam deflected by the deflector onto a surface to be scanned and forming an image as a spot on the surface to be scanned and, a synchronization detector for obtaining a scanning start position signal with respect to a main scanning direction on the surface to be scanned. The scanning optical element is provided with a light-beam passage for allowing a light beam traveling toward the synchronization detector to pass through. The light-beam passage is provided in an inner portion of the scanning optical element located outside an effective portion of the scanning optical element.

16 Claims, 6 Drawing Sheets

SCANNING OPTICAL ELEMENT WITH LIGHT-BEAM PASSAGE

BACKGROUND OF THE INVENTION

1. Field of the Invention

The present invention relates generally to an optical scanning apparatus and an image forming apparatus using the same. More particularly, the present invention relates to an optical scanning apparatus and an image forming apparatus using the same that are suitably applicable to apparatuses such as, for example, laser beam printers or digital copiers employing an electrophotographic process in which image information is formed using signals from a synchronizing-signal detecting means for controlling writing start in the main scanning direction when a beam emitted from a light source means is deflected by a deflection means and then passes through an fθ lens in a scanning optical system to optically scan a surface to be scanned and thus to form the image information.

2. Related Background Art

In conventional optical scanning apparatuses such as laser beam printers, a light beam emitted from a light source means is optically modulated according to an image signal. Then the optically modulated light beam is deflected periodically by a deflection means composed of, for instance, a polygon mirror and then is focused in a spot shape on a surface of a photosensitive recording medium by a scanning optical system having the fθ characteristics to optically scan the recording medium surface. Thus, the image information is recorded.

FIG. 6 is a perspective view showing main part of a conventional optical scanning apparatus. In FIG. 6, a divergent light beam emitted from a light source means 1 in a laser unit 3 is converted into a substantially parallel beam by a collimator lens in the unit 3. The substantially parallel beam enters a cylindrical lens 4 with its width limited by a stop in the unit 3. Among the parallel beam that has entered the cylindrical lens 4, the beam in a plane in the main scanning direction emerges in the unchanged state and that in a plane in the sub-scanning direction is converged, which then form a substantially linear image on a deflecting/reflecting surface 5a of a deflection means 5 composed of a polygon mirror.

The light beam (indicated with a broken line) reflected and deflected by the deflecting/reflecting surface 5a of the polygon mirror 5 is led onto a recording medium surface (the surface to be scanned) 10 through a scanning optical system 7 having the fθ characteristics including two fθ lenses 7a and 7b. The polygon mirror 5 is rotated by a driving means 6 at a substantially constant angular velocity, so that the recording medium surface 10 is optically scanned at a substantially constant velocity. Thus, a latent image is formed using potential difference.

Part (indicated with a solid line) of the light beam reflected and deflected by the deflecting/reflecting surface 5a of the polygon mirror 5 passes through the scanning optical system 7 and then its traveling direction is changed by a reflecting mirror (BD mirror) 11 used for synchronization detection. Afterward, the part of the beam is converged on a synchronization detecting means (BD sensor) 13 by a condenser lens (BD lens) 12 used for synchronization detection. Thus, a horizontal synchronizing signal is formed.

In a recent optical scanning apparatus, its scanning optical system having the fθ characteristics has been made compact in size with the increase in demand for making the optical scanning apparatus compact in size. Methods of making the scanning optical system compact in size include, for example, increasing the angle of view of the scanning optical system and disposing the fθ lens near the polygon mirror.

Methods of reducing the width in the main scanning direction of the fθ lens include arranging an optical path for a synchronizing light beam (BD light beam) that is different from one for a scanning beam.

The scanning beam may not be focused at a desired position on the surface to be scanned and thus the image quality may be degraded unless the fθ lens is disposed in a predetermined position with high precision. When optical elements are gathered in the vicinity of the polygon mirror to reduce the size of the whole apparatus, the synchronizing light beam and the fθ lens physically interfere with each other and thus the synchronizing light beam may be blocked.

On the other hand, Japanese Patent Application Laid-open No. 11-311749 discloses an optical scanning apparatus in which an inclined part for securing an optical path of a synchronizing light beam is provided at an end of an fθ scanning optical system as a scanning-beam imaging lens and thus the synchronizing light beam passes by the inclined part to enter a synchronization detecting means.

In Japanese Patent Application Laid-open No. 11-311749, however, due to the formation of the inclined part, the thickness of the imaging/scanning lens is reduced in the inclined part and this causes a problem of stiffness deterioration. In addition, it is difficult to provide a positioning reference in the inclined part. The positioning reference should therefore be provided in a place closer to the optical axis of the imaging/scanning lens relative to the inclined part. As a result, the spacing between the positioning references arranged in the longitudinal direction of the imaging/scanning lens is reduced. This causes the increase in rotational deviation of the imaging/scanning lens.

Furthermore, in Japanese Patent Application Laid-open No. 11-223789, in FIG. 1, a laser beam emitted from a laser unit 5 passes through a laser beam transmission hole 11a provided in a fθ lens 11, enters a rotary polygon mirror 4, and then optically scans a photosensitive member surface 9 through the fθ lens 11.

The rotary polygon mirror 4 allows a laser beam that has passed through an inner portion of the fθ lens 11 among the laser beam reflected by the rotary polygon mirror 4 to enter a light-receiving element 8 for detecting a synchronizing signal. Thus, a horizontal periodic signal is obtained from the light-receiving element 8.

SUMMARY OF THE INVENTION

The present invention is intended to further improve the optical scanning apparatuses disclosed in the publications described above. It is an object of the present invention to provide an optical scanning apparatus in which a wide-angle scanning optical system can be used, the scanning optical system can be disposed closely to a deflection means, and the reduction in size of the whole optical scanning apparatus can be achieved easily. It is also an object of the present invention to provide an image forming apparatus using the optical scanning apparatus.

The present invention is intended to solve the problems of stiffness deterioration and increased rotational deviation of the scanning/imaging lens disclosed in Japanese Patent Application Laid-open No. 11-311749.

According to a first aspect of the present invention, there is provided an optical scanning apparatus, characterized in that: the optical scanning apparatus includes: a light source means: a deflection means with a deflecting/reflecting surface, the deflection means deflecting an incident light beam from the light source means by the deflecting/reflecting surface; a scanning optical system including at least one scanning optical element for leading the light beam deflected by the deflection means onto a surface to be scanned and forming an image as a spot on the surface to be scanned; and a synchronization detecting means for obtaining a scanning start position signal with respect to a main scanning direction on the surface to be scanned; and in that the scanning optical element is provided with a light-beam passage for allowing a light beam traveling toward the synchronization detecting means to pass through, the light-beam passage being provided in an inner portion of the scanning optical element located outside an effective portion of the scanning optical element.

According to a second aspect of the present invention, in the first aspect of the invention, the optical scanning apparatus is characterized in that the scanning optical element is provided with a positioning reference at an end in a longitudinal direction of the scanning optical element, and the positioning reference is located within an area where the light-beam passage is present or on an outer side of the area with respect to an optical axis.

According to a third aspect of the present invention, in the first aspect of the invention, the optical scanning apparatus is characterized in that the scanning optical element is provided with a positioning reference at each of one end having the light-beam passage and the other end in a longitudinal direction of the scanning optical element, and the positioning reference at the one end having the light-beam passage is located within an area where the light-beam passage is present or on an outer side of the area with respect to an optical axis, in the longitudinal direction of the scanning optical element.

According to a fourth aspect of the present invention, in the first aspect of the invention, the optical scanning apparatus is characterized in that the scanning optical element having the light-beam passage is disposed in a place closest to the deflection means.

According to a fifth aspect of the present invention, in the first aspect of the invention, the optical scanning apparatus is characterized in that an angle between a principal ray of part of the light beam deflected by the deflection means traveling toward an end within a scanning effective width on the surface to be scanned and a principal ray of part of the light beam deflected by the deflection means traveling toward the synchronization detecting means is set not to exceed 3°.

According to a sixth aspect of the present invention, in the second aspect of the invention, the optical scanning apparatus is characterized in that the positioning reference is provided on a surface of the scanning optical element at the deflection means side so as to position the scanning optical element with respect to a direction of the optical axis.

According to a seventh aspect of the present invention, in the second aspect of the invention, the optical scanning apparatus is characterized in that the positioning reference is provided on a surface substantially parallel to a cross section in the main scanning direction of the scanning optical element so as to position the scanning optical element with respect to a sub-scanning direction.

According to an eighth aspect of the present invention, in the first aspect of the invention, the optical scanning apparatus is characterized in that the incident light beam traveling toward the deflection means is incident on the deflection means from a direction oblique to an optical axis in a main scanning plane, the light-beam passage for allowing a light beam traveling toward the synchronization detecting means to pass through is provided on a side opposite to the light source means in the main scanning direction with respect to the optical axis.

According to a ninth aspect of the present invention, in the first aspect of the invention, the optical scanning apparatus is characterized in that the light-beam passage for allowing a light beam traveling toward the synchronization detecting means to pass through is provided at one end in a longitudinal direction of the scanning optical element, and a light-beam passage for allowing a light beam traveling toward the deflection means to pass through is provided at the other end in the longitudinal direction of the scanning optical element.

According to a tenth aspect of the present invention, in the first aspect of the invention, the optical scanning apparatus is characterized in that the scanning optical element is a scanning lens.

According to an eleventh aspect of the present invention, in the first aspect of the invention, the optical scanning apparatus is characterized in that the light-beam passage is a notch portion provided by cutting a part of an end of the scanning optical element.

According to a twelfth aspect of the present invention, in the ninth aspect of the invention, the optical scanning apparatus is characterized in that the scanning lens having the light-beam passage for allowing a light beam traveling toward the synchronization detecting means to pass through is formed by injection molding, the light-beam passage is formed at an end in the longitudinal direction of the scanning lens, and an injection port used during the injection molding is formed at the other end.

According to a thirteenth aspect of the present invention, in the ninth aspect of the invention, the optical scanning apparatus is characterized in that the scanning lens is a molded lens made of a plastics material.

According to a fourteenth aspect of the present invention, in the tenth aspect of the invention, the optical scanning apparatus is characterized in that the positioning reference is arranged in a symmetrical form in a sub-scanning direction.

According to a fifteenth aspect of the present invention, there is provided an image forming apparatus, characterized by including: an optical scanning apparatus according to any one of the first to fourteenth aspects of the invention; a photosensitive member disposed on a surface to be scanned; a developing device for developing an electrostatic latent image as a toner image, the electrostatic latent image being formed on the photosensitive member with a light beam scanned by the optical scanning apparatus; a transfer device for transferring the toner image developed by the developing device onto a material onto which the toner image is to be transferred; and a fixing device for fixing the toner image transferred on the material onto the material.

According to a sixteenth aspect of the present invention, there is provided an image forming apparatus, characterized by including: an optical scanning apparatus according to any one of the first to fourteenth aspects of the invention; and a printer controller for converting code data input from an external device into an image signal and inputting the image signal to the optical scanning apparatus.

The positioning references are provided at both ends of the scanning optical element to control the position and rotation of the scanning optical element. However, when the spacing between two positioning references for the control with respect to one direction is reduced, the rotation cannot be controlled with high precision.

For example, when an inclined part is present at an end of the scanning optical element, it is difficult to locate a positioning reference member in the inclined part. The positioning reference should therefore be located in a place closer to the optical axis relative to the inclined part. This results in a narrower spacing between the two positioning references for the control with respect to one direction and increased rotational deviation of the scanning/imaging element. Consequently, the aberration on the surface to be scanned is aggravated to cause a problem.

In this case, two rotational deviations are involved.

One is a deviation caused by rotation about an axis parallel to the sub-scanning direction. This rotational deviation is determined by the spacing in the main scanning direction between the two positioning references arranged in the main scanning direction for controlling the position in the optical axis direction and the difference between the position errors in the optical axis direction of the respective positioning references.

The other is a deviation caused by rotation about an axis parallel to the optical axis. This rotational deviation is determined by the spacing in the main scanning direction between the two positioning references arranged in the main scanning direction for controlling the position in the sub-scanning direction and the difference between the position errors in the sub-scanning direction of the respective positioning references.

In addition, the scanning/imaging element has a reduced thickness and thus has a lower stiffness in the inclined part, which is a problem.

The above-mentioned problem is solved by providing the scanning optical element with the light-beam passage for allowing a light beam traveling toward the synchronization detecting means to pass through.

The light-beam passage may be formed, for example, in a notch shape and an opening shape. The positioning reference can be provided within an area where the light-beam passage is present or outside the area, so that it is possible to provide a wide spacing in the main scanning direction between the two positioning references arranged in the main scanning direction for controlling the position in the optical axis direction. Thus, the rotational deviation of the scanning/imaging element about the axis parallel to the sub-scanning direction can be controlled with high precision. Similarly, a wide spacing in the main scanning direction between the positioning references for controlling the position in the sub-scanning direction can be provided. Thus, the rotational deviation of the scanning/imaging element about the axis parallel to the optical axis direction can be controlled with high precision.

The scanning optical element has a reduced thickness only in a portion where the light-beam passage is provided, and a thick portion is present on the outer side of the light-beam passage. As a result, the stiffness deterioration amount can be suppressed to be very small. Particularly, the portions of the scanning optical element where the positioning references are provided are required to have sufficient stiffness for enduring the force applied to the scanning optical element by a spring or the like. In this respect, the light-beam passage has a suitable form.

DETAILED DESCRIPTION OF THE PREFERRED EMBODIMENTS

Embodiments of the present invention will be described with reference to the drawings.

Embodiment 1

Figure 1:
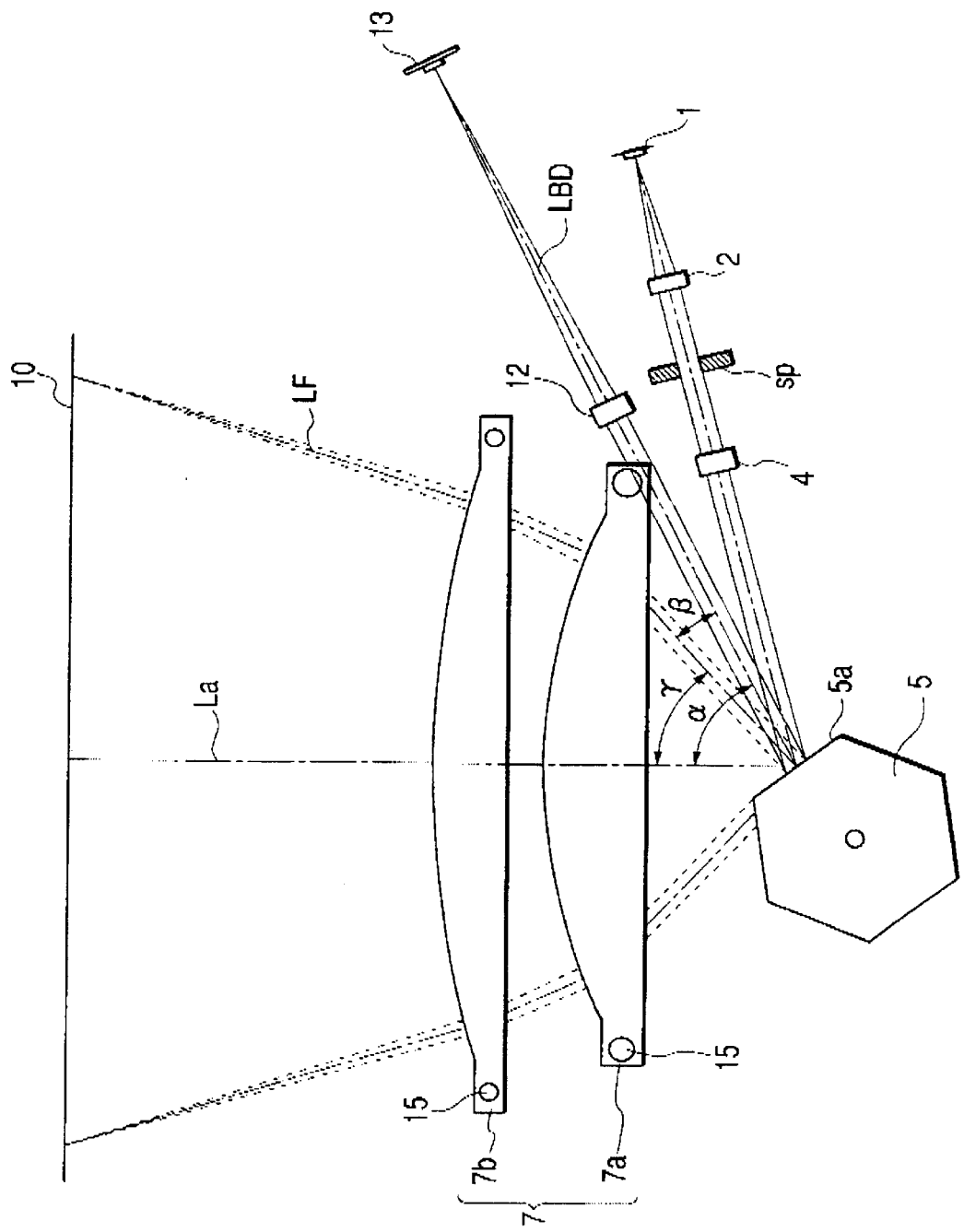
FIG. 1 is a cross-sectional view in the main scanning direction of an optical scanning apparatus according to Embodiment 1 of the present invention.

FIG. 1 is a cross-sectional view in the main scanning direction showing main part of an optical scanning apparatus according to Embodiment 1 of the present invention in the case where the optical scanning apparatus is used in an image forming apparatus such as a laser beam printer, a digital copier, or the like.

Figure 2:
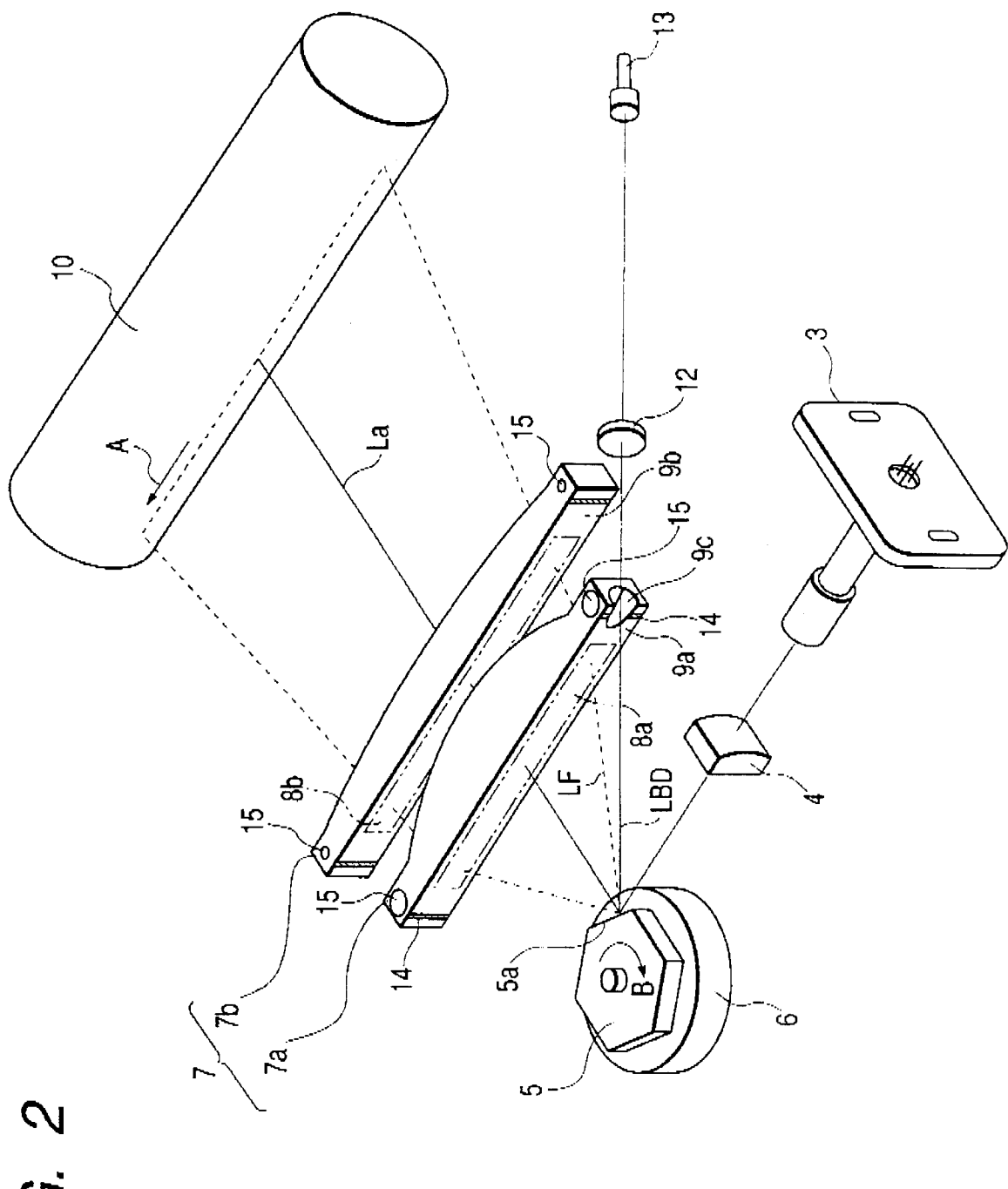
FIG. 2 is a perspective view showing main part of the optical scanning apparatus according to Embodiment 1 of the present invention.

FIG. 2 is a perspective view of the main part shown in FIG. 1. Here, the "main scanning direction" denotes the direction in which a light beam is deflected for scanning by a deflection means 5. The "sub-scanning direction" denotes the direction orthogonal to the optical axis of an f$\ominus$ lens 7 and the main scanning direction.

In the figures, a light source means 1 is, for example, a semiconductor laser. A divergent light beam modulated based on image information from the light source means 1 is converted into a substantially parallel light beam by a collimator lens 2. The width of the substantially parallel light beam is limited by a stop SP. Then, the light beam with the limited width is converged only in the sub-scanning direction by a cylindrical lens 4 to be focused near a deflecting/reflecting surface 5a of a polygon mirror 5 as a deflection means and thus to form a longitudinal line in the main scanning direction.

Numeral 3 indicates a replaceable laser unit in which the semiconductor laser 1, the collimator lens 2, the stop SP, and the like are combined into one unit. The polygon mirror 5 is rotated by a driving means 6 such as a motor at a constant velocity in the direction indicated with the arrow B. The polygon mirror 5 reflects and deflects the light beam emitted from the semiconductor laser 1 at a substantially constant angular velocity. Numeral 7 denotes a scanning optical system (f$\ominus$ lenses) with the f$\ominus$ characteristics. The scanning optical system 7 is composed of two f$\ominus$ lenses (scanning lenses) 7a and 7b made of a synthetic resin material. The scanning optical system 7 allows the light beam reflected and deflected by the polygon mirror 5 to scan over a photosensitive drum 10 as a surface to be scanned in the direction indicated with the arrow A in FIG. 2.

The two f$\ominus$ lenses (scanning lenses) 7a and 7b are plastic lenses formed by a mold process.

The scanning optical system 7 is shown as an example composed of two lenses, one spherical lens and one toric lens. However, the scanning optical system 7 may be composed of only one toric lens or three lenses including a toric lens or more.

Instead of the photosensitive drum, a sensor such as a CCD or the like may be used to read image information digitally. Part of the light beam reflected and deflected by the polygon mirror 5 passes through a light transmission part provided outside an effective area of the scanning optical system 7 and then enters a condenser lens (BD lens) 12 for synchronization detection to be led to a synchronization detecting means (BD sensor) 13. A writing start position synchronizing signal for adjusting the timing of the horizontal scanning start position on the photosensitive drum 10 is obtained from the BD sensor 13.

In order to reduce the size of the scanning optical system 7, in the present embodiment, a wide angle of view of ±48° as the main scanning angle of view is employed. In this case, the light beam (indicated with a solid line) LBD for synchronization detection is not permitted to pass within the effective optical path of the scanning optical system 7, so that the width in the main scanning direction of the fθ lenses 7a and 7b is made narrow. The fθ lenses 7a and 7b are disposed closely to the polygon mirror 5, and thereby the scanning optical system 7 is made compact in size.

As described above, the optical scanning apparatus as a whole is made compact in size by using the scanning optical system 7 making it possible to scan at a wide angle of view and by providing the optical system 12 for synchronization detection in another unit. In this case, due to the scanning at a wide angle of view, a wide area of the reflecting surface 5a of the polygon mirror 5 is used in scanning the surface to be scanned. The increase in size of the polygon mirror is suppressed by not allowing the reflecting surface to have a sufficient length for reflecting and deflecting a light beam traveling toward the synchronization detecting means 13 at a wide angle of view enough for preventing the light beam from passing through the fθ lens 7a. In this case, however, there is a problem in that the BD light beam LBD may be blocked by the portion located outside the effective area of the fθ lens.

Hence, in the present embodiment, a light-beam passage formed of a conical notch portion conically scooped out is formed in a part of a portion (composed of a lens portion or a lens frame) 9a located outside the effective portion 8a of the fθ lens 7a. Thus, the light beam (indicated with the solid line) traveling toward the synchronization detecting means 13 is prevented from being blocked.

An optical member made of the same material as that of the fθ lens 7a may be used as the light-beam passage 9c. The optical member may be, for example, a light-beam passage around the edge of the fθ lens 7a or a light transmission surface (such as a flat or curved surface) extending from the surface of the fθ lens 7a. This is also true for the following respective embodiments.

As described above, the light-beam passage 9c for the BD light beam LBD is provided to allow the respective optical elements to be disposed effectively. Thus, the reduction in size of the optical scanning apparatus has been achieved. Here, with respect to the optical axis La of the scanning optical system 7, the angle α of the principal light beam (indicated with a solid line) LBD traveling toward the synchronization detecting means 13 is 63° and a principal light beam (indicated with a broken line) LF traveling toward an end of the scanning effective portion on the surface to be scanned 10 is deflected at an angle γ of 48°. As shown in FIG. 1, the angle β between two light beams, the principal light beam LBD and the principal light beam LF, is 15°. Thus, the scanning optical system 7 can be made compact in size without increasing the size of the polygon mirror 5. As a result, the reduction in size of the optical scanning apparatus as a whole is achieved. In this case, it is convenient to set the angle β not to exceed 30°.

Preferably, the angle β is 10° to 30°. With the angle β within this range, the scanning optical system 7 can be disposed closely to the polygon mirror 5 while the principal light beam LF traveling toward the end of the scanning effective portion and the principal light beam LED traveling toward the synchronization detecting means 13 are separated in an excellent manner. Thus, it is easy to reduce the size of the optical scanning apparatus as a whole.

In addition, a positioning reference 14 for determining the position in the optical axis direction of the scanning optical system 7 is provided in places (within the area where the light-beam passage 9c is present) that are located on a side face of the fθ lens 7a and above and below, in the sub-scanning direction (a shorter-side direction), the conical notch portion 9c as the light-beam passage for the light beam (indicated with a solid line) traveling toward the synchronization detecting means 13. With the positioning reference 14, the fθ lens 7a is disposed with high precision with respect to the optical axis La direction. In addition, a wide spacing in the optical axis La direction is provided between two positioning references 14, so that the fθ lens 7a is also disposed with high precision with respect to the rotational deviation about an axis parallel to the sub-scanning direction. Furthermore, positioning references 15 for determining the position in the sub-scanning direction is provided in places (within the area where the light-beam passage 9c is present) that are located on the lower face of the fθ lens 7a and above and below the conical notch portion. With the positioning references 15, the fθ lens 7a is positioned with high precision with respect to the sub-scanning direction. In addition, a wide spacing in the main scanning direction is provided between two positioning references 15 for positioning with respect to the sub-scanning direction, so that the fθ lens 7a is also disposed with high precision with respect to the rotational deviation about an axis parallel to the optical axis. Thus, the light-beam passage 9c is provided outside the effective portion of the fθ lens 7a, so that the positioning references 14 and 15 can be provided at the ends of the fθ lens 7a. Further, a wide spacing is provided between each two of the positioning references 14 and 15, so that the fθ lens 7a can be positioned with high precision with respect to the rotational deviation. As a result, an optical scanning apparatus is obtained which allows an image to be formed in a desired position on the photosensitive drum 10 to have a desired spot diameter and thus can provide excellent images continuously.

The more detailed description is provided. In order to control the rotational deviation of the scanning optical element, it is advantageous in precision to space a plurality of positioning references.

For instance, the rotational deviation (x-axis rotational deviation) about an axis parallel to the optical axis is determined from the difference in height between two positioning references provided for positioning with respect to the sub-scanning direction and the spacing in the main scanning direction between those positioning references. Even if the difference in height is unchanged, the rotational deviation amount is smaller when a wider spacing in the main scanning direction is provided.

The rotational deviation (z-axis rotational deviation) about an axis parallel to the sub-scanning direction is determined from the difference in position in the optical axis direction between two positioning references provided for positioning with respect to the optical axis direction arranged in the main scanning direction and the spacing in the main scanning direction between them. Even if the difference in position in the optical axis direction is unchanged, the rotational deviation amount is smaller when the spacing in the main scanning direction is wider. With respect to these rotational deviations, when the two reference planes arranged in the main scanning direction are spaced in the main scanning direction, the rotational deviation of the optical element can be suppressed.

The merit of providing the light-beam passage lies in the following point. That is, the positioning references provided for positioning with respect to the optical axis direction and the sub-scanning direction can be spaced in the main scanning direction since they can be arranged inside or outside the area where the light-beam passage is present.

Furthermore, it is also possible to improve the degree of freedom in arranging the positioning reference plane on the surface on the deflection means side of the scanning optical element.

Types of the light-beam passage includes a notch, a through hole, a base. Among them, the "notch" has the following merits.

Here, the "notch" shape is those allowing the light-beam passage to be formed with a part of the external shape of the portion located outside the effective portion remaining in the shorter-side direction of the scanning optical element, and allowing the light-beam passage to go through from the surface on the deflection means side to the side face of the scanning optical element. In this case, the light-beam passage may go through to the surface located on the side of the surface to be scanned of the scanning optical element.

The "through hole" has a shape with an opening going through from the surface on the deflection means side to the surface located on the side of the surface to be scanned of the scanning optical element. The opening has side walls in all directions.

The a "base" shape is those formed by cutting out the upper portion in the shorter-side direction of the scanning optical element while only the lower portion remains.

The notch shape is different from the base shape in that the notch shape allows positioning references provided for positioning with respect to the optical axis direction and the sub-scanning direction to be arranged on the upper and lower sides.

Hence, the optical element can be used in an upside-down state. This expands the scope of application of the optical element and also results in cost reduction.

In addition, since the positioning references provided for positioning with respect to the optical axis direction can be arranged on the upper and lower sides in the sub-scanning direction, there is a merit that the rotational deviation (y-axis rotational deviation) about an axis parallel to the main scanning direction of the optical element can be controlled.

The rotational deviation about the axis parallel to the main scanning direction of the optical element can be controlled with the two positioning references provided for positioning with respect to the sub-scanning direction arranged in the optical axis direction. However, compared to the spacing in the optical axis direction between the two positioning references provided for positioning with respect to the sub-scanning direction, a wider spacing can be provided between the positioning references provided for positioning with respect to the optical axis direction arranged in the sub-scanning direction, which is advantageous in rotation control.

The positioning references are also required to have strength. In this respect, the "notch shape" allows sufficient strength to be maintained.

Thus, the "notch shape" is advantageous as compared to the "base shape".

The optical element of the present embodiment is a molded article. In view of molding, the "notch shape" is advantageous as compared to the "through hole".

The "notch shape" is a shape allowing the thickness of the scanning optical element to be reduced in the light-beam passage gradually toward the outside of the scanning optical element and thus has no big problem in moldability.

As compared to this, in case of the "through hole", the through hole portion has a considerably reduced thickness and the portion located on the outer side of the through hole has an increased thickness. This results in poor moldability.

From the viewpoint of the mold configuration, the mold used for forming the "notch shape" has a simple configuration since the "notch shape" can be formed through insertion and removal of another piece with respect to a side face that is not the optical surface. On the other hand, in case of the "through hole", it is necessary to provide a protrusion for forming the through hole in a piece to be disposed on the optical surface side. Thus, the mold for forming the "through hole" has a complicated configuration.

For this reason, the "notch shape" is advantageous as compared to the "through hole shape".

As described above, the improvement in optical performance and cost reduction can be achieved when the light-beam passage is provided and is formed in the "notch shape".

Any of strip, circular, and rectangular shapes may be used as the shapes of the positioning references according to the present embodiment. However, the circular shape is most preferable since burrs may be produced at the corners during molding in case of using the strip and rectangular shapes.

Furthermore, in case of using the strip shape, a rising portion may be produced in the middle part through molding. Since this makes accurate positioning impossible and thus causes a problem, it is most suitable to use a circular shape divided into two parts by removing its middle portion. In this case, the positioning reference divided into two parts may be located across the light-beam passage.

In the present embodiment, even when the light-beam passage for allowing light beams to pass through that is provided outside the effective area of the fΘ lens has a shape of an opening (through hole) going through from the surface located on the deflection mean side to the surface located on the side of the surface to be scanned, the effects of the present invention can be obtained sufficiently. This is also true for the following respective embodiments.

Embodiment 2

Figure 3:
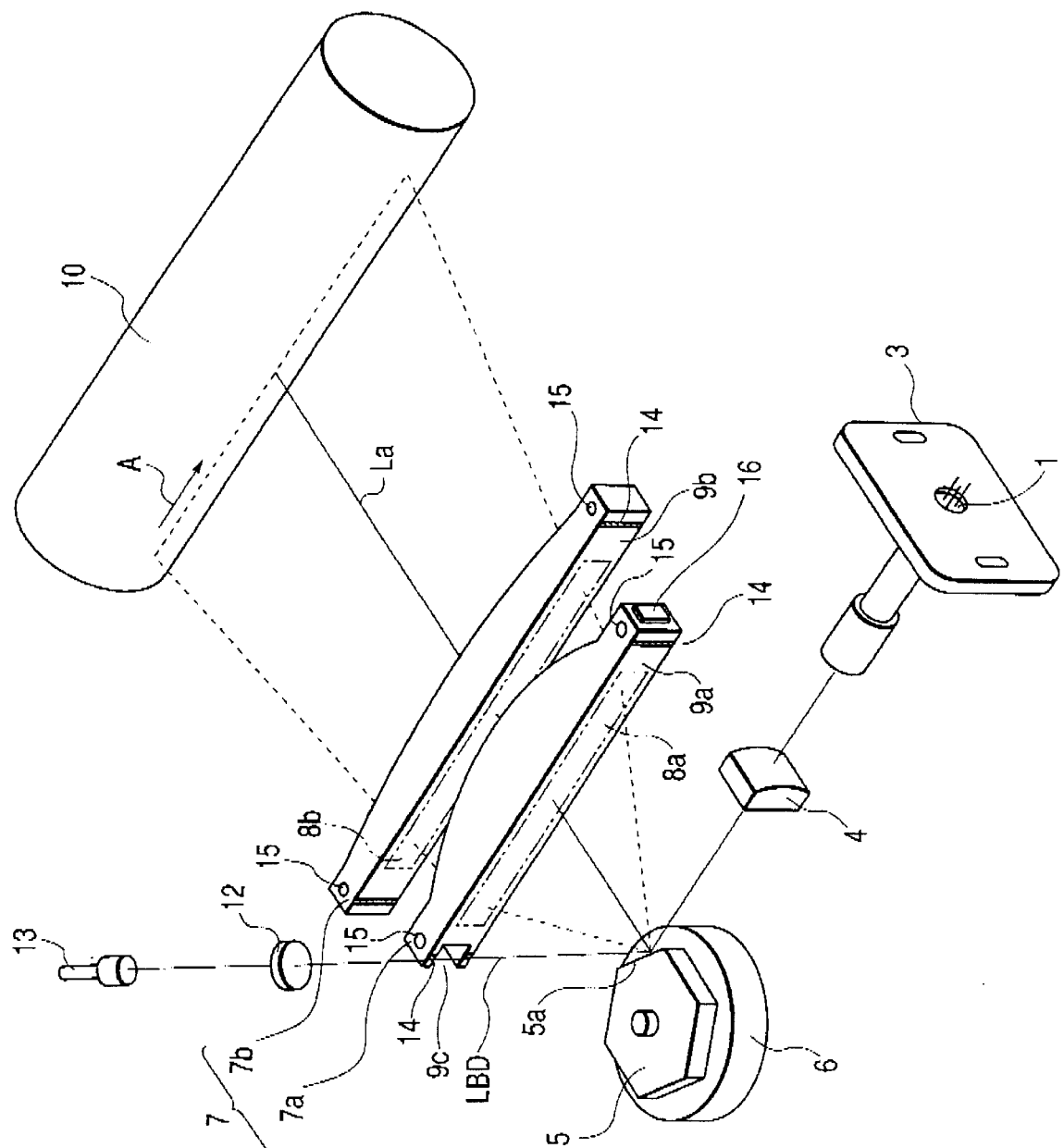
FIG. 3 is a perspective view showing main part of an optical scanning apparatus according to Embodiment 2 of the present invention.

FIG. 3 is a perspective view showing main part of an optical scanning apparatus according to Embodiment 2 of the present invention.

The present embodiment is different from Embodiment 1 in that a synchronization detecting means 13 is provided on the side opposite to a laser unit 3 with respect to an optical axis La, and a light-beam passage 9c is provided which is formed of a rectangular notch portion formed by scooping out a part of a portion 9a located outside the effective portion of the fΘ lens 7a so that a light beam (indicated with a solid line) LBD traveling toward the synchronization detecting means 13 is not blocked.

As in Embodiment 1, positioning references 14 and 15 are provided at the surfaces of the fθ lens 7a.

In this embodiment, the scanning direction in which a scanning optical system 7 allows a light beam (indicated with a broken line) to scan over a photosensitive drum 10 is indicated with the arrow A in the figure and is opposite to that in Embodiment 1. When the synchronization detecting means 13 is disposed on the side opposite to the light source means 1 with respect to the optical axis La, arrangement of the respective elements is facilitated. Generally, this however reduces the margin in the main scanning direction of a deflecting/reflecting surface 5a of a polygon mirror 5. Thus, this is disadvantageous for optical scanning at a wide angle of view. Hence, in the present embodiment, as described above, the light-beam passage 9c provided by cutting out in a rectangular shape is formed in a part of the lens portion or lens frame located in a portion 9a located outside the effective portion on the synchronization detecting means 13 side in the main scanning direction of the fθ lens 7a so that the light beam (indicated with a solid line) LBD traveling toward the synchronization detecting means 13 is not blocked. Thus, the scanning optical system 7 with a wide angle of view is configured. In addition, the light-beam passage 9c is formed on the side opposite to a gate 16 where resin is injected in injection molding. This reduces an adverse effect of irregularities such as weld caused by molding.

In a plastic lens, its ends with a reduced thickness have lower strength and thus tend to be deformed in molding. Hence, a through hole is formed to provide an effect of suppressing the decrease in strength at the lens end and thus a plastic lens with stable moldability is obtained.

Embodiment 3

Figure 4:
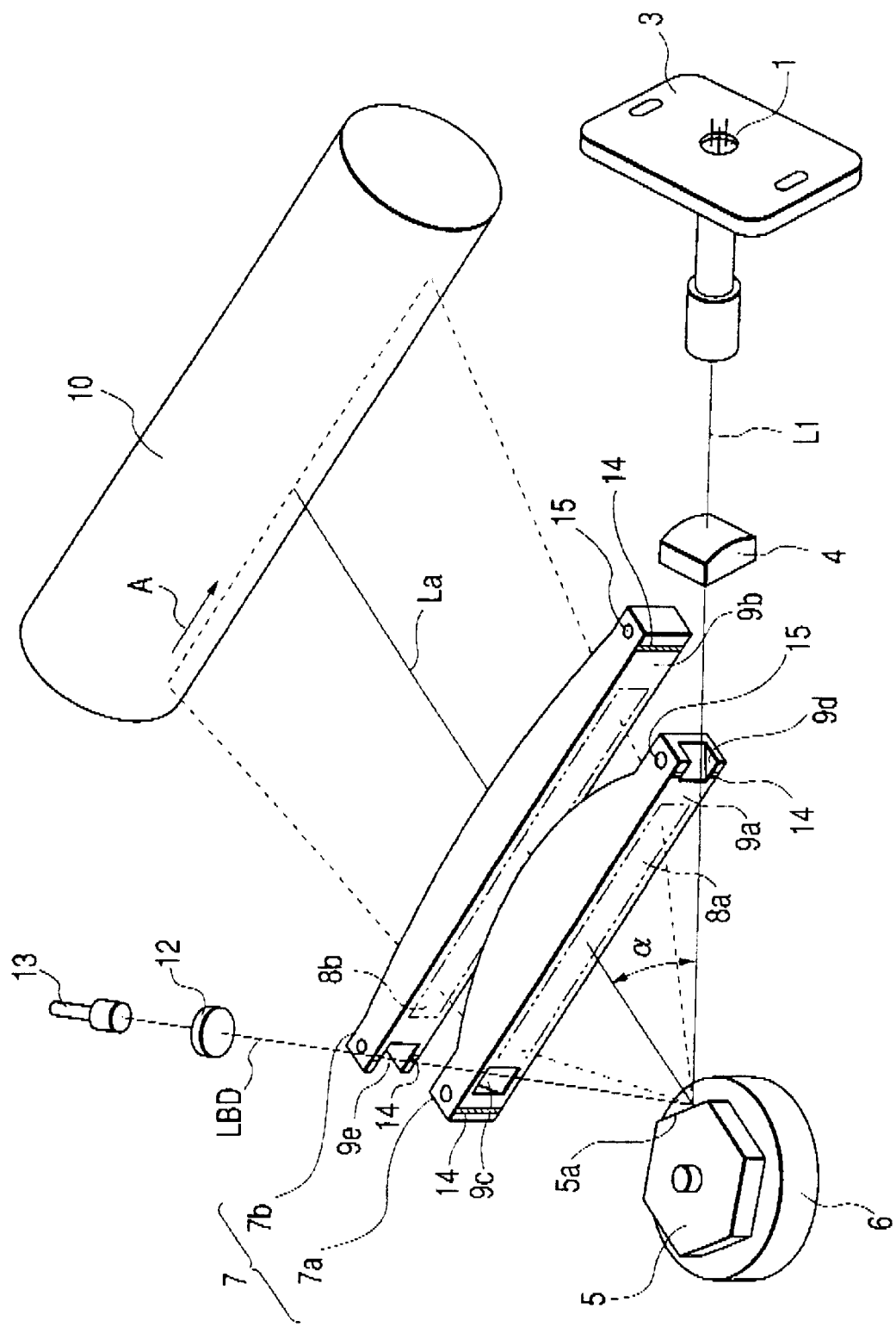
FIG. 4 is a perspective view showing main part of an optical scanning apparatus according to Embodiment 3 of the present invention.

FIG. 4 is a perspective view showing main part of an optical scanning apparatus according to Embodiment 3 of the present invention.

The present embodiment is different from Embodiment 1 in the following points. A first light-beam passage 9d is provided which is formed of a notch portion provided by cutting, in a rectangular shape, a part of a portion 9a located outside the effective portion of the fθ lens 7a so that a light beam emitted from a laser unit 3 is not blocked. A synchronization detecting means 13 is provided on the side opposite to the laser unit 3 with respect to the optical axis La. A second light-beam passage 9c and a third light-beam passage 9e are provided so that a light beam (indicated with a solid line) traveling toward the synchronization detecting means 13 is not blocked. The second light-beam passage 9c is formed of a through hole provided by cutting, in a rectangular shape, a part of the portion 9a located outside the effective portion of the fθ lens 7a. The third light-beam passage 9e is formed of a notch portion provided by cutting, in a rectangular shape, a part of a portion 9b located outside an effective portion of the fθ lens 7b.

Respective positioning references 14 and 15 provided at the surfaces of the fθ lens 7a shown in FIG. 4 are provided symmetrically in the main scanning direction with respect to the optical axis.

In the present embodiment, the respective positioning references 14 and 15 at the left end of the fθ lens 7a are located on the outer side of the area where the light-beam passage 9c is present, in the longitudinal direction of the fθ lens 7a with respect to the optical axis.

Thus, as compared to the case in Embodiment 1, a longer distance in the main scanning direction is obtained between the positioning references 14 located at the right and left ends of the fθ lens 7a. Consequently, the arrangement with higher precision is achieved with respect to the rotational deviation about an axis parallel to the sub-scanning direction.

Similarly, as compared to the case in Embodiment 1, a longer distance in the main scanning direction is obtained between the positioning references 15 located at the right and left ends of the fθ lens 7a. Consequently, the arrangement with higher precision is achieved with respect to the rotational deviation about an axis parallel to the optical axis direction.

The fθ lens 7b also is provided with positioning references 14 and 15 on its surfaces. The respective positioning references 14 and 15 are provided symmetrically in the main scanning direction with respect to the optical axis.

In the present embodiment, the incident optical system including a light source means 1, a cylindrical lens 4, and the like is disposed with a narrower incident angle in the deflection surface shown in the figure. The synchronization detecting means 13 is also disposed in a position closer to the optical axis La of the scanning optical system 7. Furthermore, the light-beam passages 9c, 9d, and 9e are provided in the portions located outside the effective portions so that the respective light beams are not blocked by the fθ lenses 7a and 7b. Thus, a more compact optical scanning apparatus than that of the embodiments described above is obtained.

Furthermore, in the case where the scanning optical system 7 is disposed closely to the polygon mirror 5, spaces between the fθ lenses 7a and 7b and the incident light beam L1 emitted from the light source means 1 and the BD light beam (indicated with a solid line) LBD traveling toward the synchronization detecting means are reduced. Consequently, it is difficult to arrange them without causing interference.

From this point of view, in the present embodiment, the light-beam passage 9d for preventing the incident light beam L1 from being blocked and the light-beam passage 9c for preventing the BD light beam (indicated with the solid line) LBD from being blocked are provided at the ends of the one fθ lens 7a and thus the scanning optical system 7 is disposed closely to the polygon mirror 5. In addition, the light-beam passage 9e is also provided in the portion 9b located outside the effective portion of the fθ lens 7b. This allows the fθ lens 7b also to be disposed closely to the polygon mirror 5. Consequently, the scanning optical system 7 can be made compact in size and thus further reduction in size of the optical scanning apparatus is achieved.

In the respective embodiments described above, one light beam emitted from the laser unit 3 was used. However, a multi-laser unit that emits a plurality of light beams in the sub-scanning direction may be used to allow a plurality of light beams to scan over the photosensitive drum. In addition, the scanning optical system 7 may be composed of three lenses or more and the respective lenses may be provided with light-beam passages.

The light beams L1 and LBD may be allowed to pass through prisms for deflecting the light beams to the locations of the light-beam passages 9c, 9d, and 9e, or may be allowed to pass through planar portions where light-beam passages are provided in refraction surfaces extending from the curved surfaces of the fθ lenses or in the peripheries of the fθ lenses.

In Embodiments 1 to 3, two fθ lenses were used as scanning optical elements, but the scanning optical elements are not limited to them. A reflecting mirror or a diffraction optical element may be used as the scanning optical elements.

In the present invention, for Instance, a light-beam passage may be provided in an inner portion located outside an effective portion of a reflecting mirror such as a cylindrical mirror.

Furthermore, a light-beam passage may be provided in an inner portion located outside the effective portion of a diffraction optical element with a diffraction grating placed on a flat plate.

Figure 5:
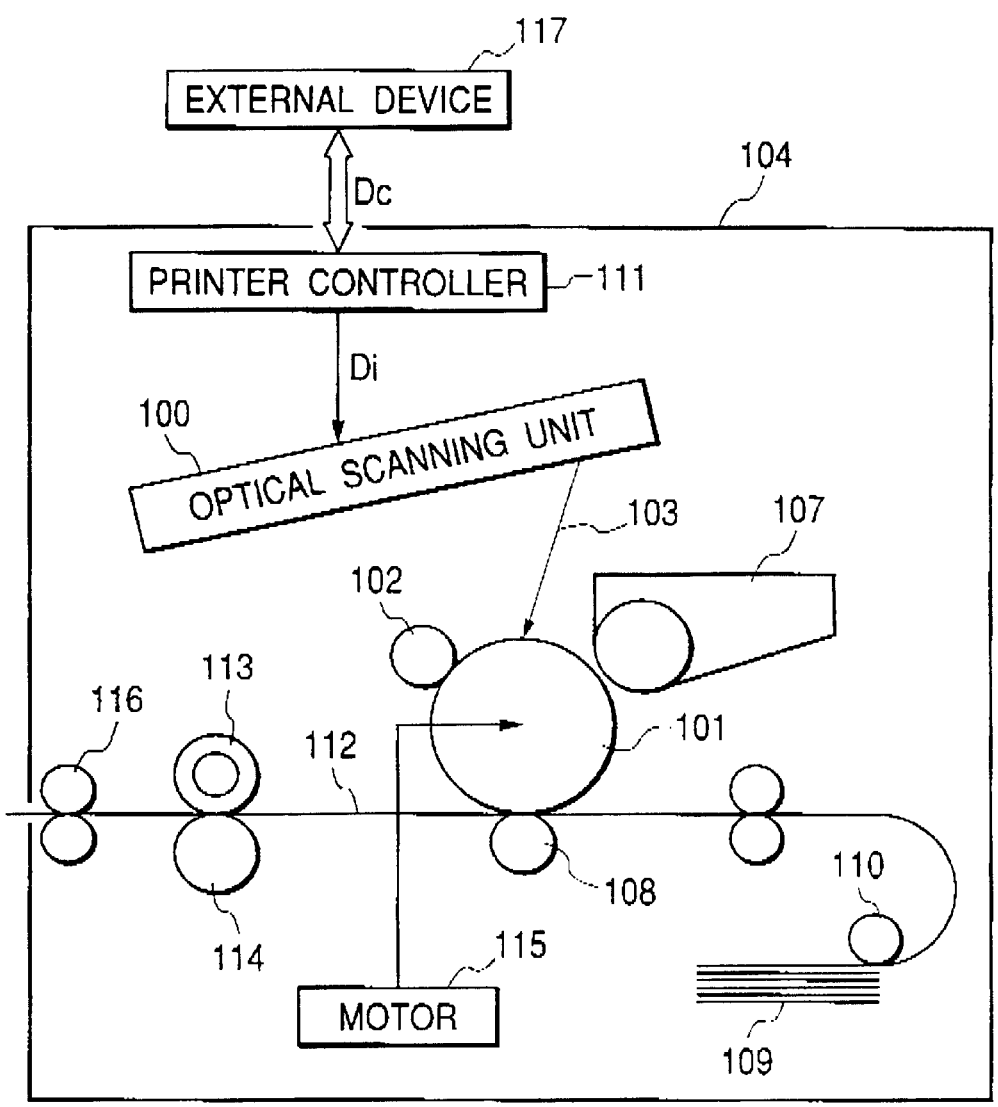
FIG. 5 is a cross-sectional view in the sub-scanning direction depicting main part showing a configuration example of an image forming apparatus using an optically scanning optical system of the present invention.
Figure 6:
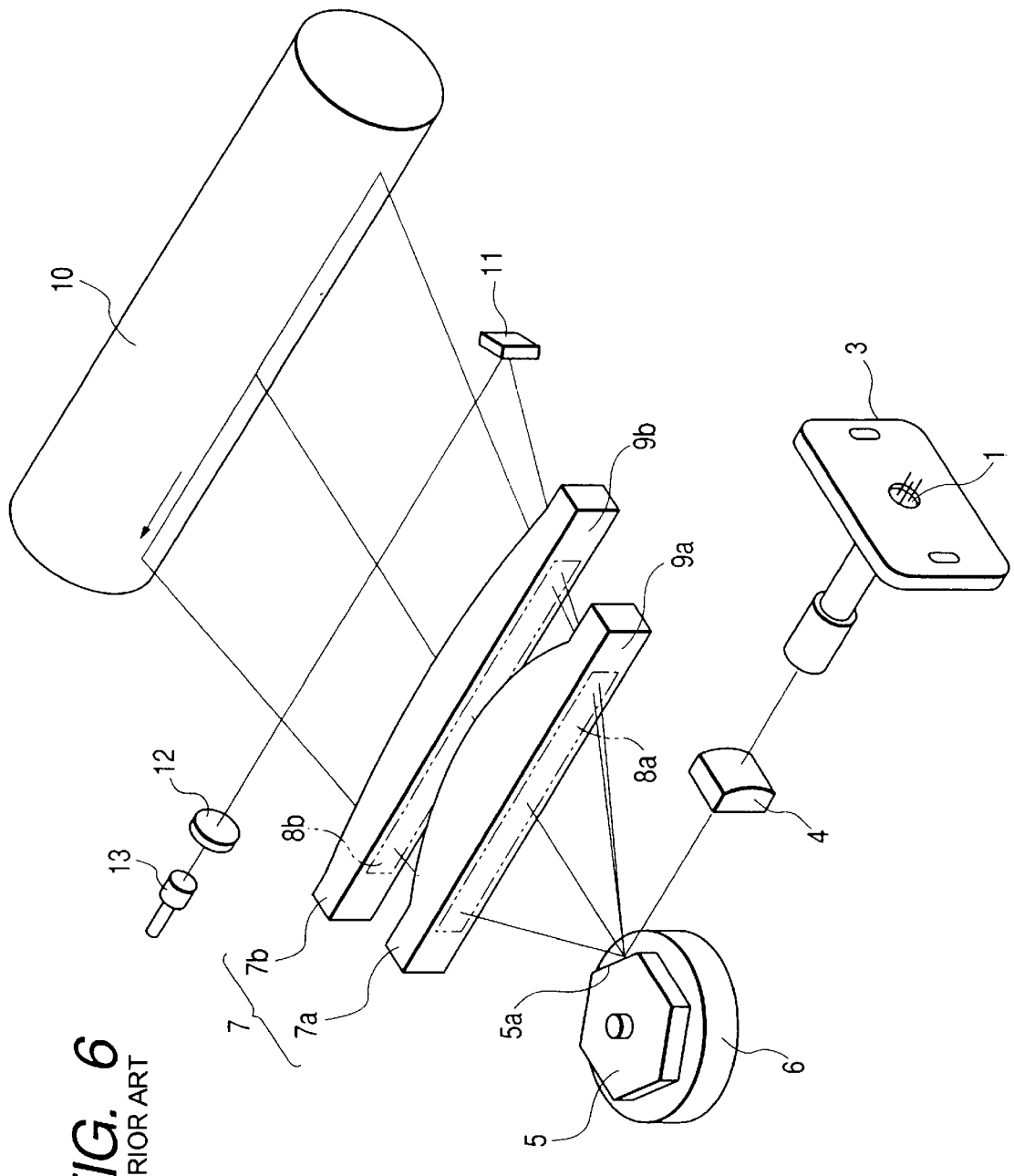
FIG. 6 is a perspective view showing main part of a conventional optical scanning apparatus.

FIG. 5 is a cross-sectional view In the sub-scanning direction showing main part of an embodiment of an image forming apparatus (an electrophotographic printer) with an optically scanning optical system of the present invention. In FIG. 5, numeral 104 indicates the image forming apparatus. In this image forming apparatus 104, code data Dc are input from an external device 117 such as a personal computer or the like. The code data Dc are converted into image data (dot data) Di by a printer controller 111 inside the apparatus. The image data Di are input to an optical scanning unit 100. From this optical scanning unit 100, a light beam 103 modulated according to the image data Di is emitted and scans a photosensitive surface of a photosensitive drum 101 in the main scanning direction.

The photosensitive drum 101 as an electrostatic latent image bearing member (photosensitive member) is rotated clockwise by a motor 115. According to the rotation, the photosensitive surface of the photosensitive drum 101 moves in the sub-scanning direction orthogonal to the main scanning direction with respect to the light beam 103. A charging roller 102 for uniformly charging the surface of the photosensitive drum 101 is provided above the photosensitive drum 101 to be in contact with the surface. The surface of the photosensitive drum 101 charged by the charging roller 102 is irradiated with the light beam 103 scanned by the optical scanning unit 100.

As described before, the light beam 103 has been modulated based on the image data Di. The irradiation with this light beam 103 allows an electrostatic latent image to be formed on the surface of the photosensitive drum 101. This electrostatic latent image is developed as a toner image by a developing device 107. The developing device 107 is provided to be in contact with the photosensitive drum 101 further downstream from the above-mentioned location irradiated with the light beam 103 in the direction of rotation of the photosensitive drum 101. Toner particles used here are, for example, those having the opposite sign to the charge provided through the charging by the charging roller 102. Thus, non-exposed portions of the photosensitive drum are the portions (printing-element parts) to which the toner adheres. In other words, in the present embodiment, so-called normal development is carried out. In the present embodiment, however, reversal development may be carried out in which toner adheres to the exposed portions of the photosensitive drum.

The toner image developed by the developing device 107 is transferred by a transfer roller 108 onto a paper as a material onto which toner images are to be transferred. The transfer roller 108 is provided below the photosensitive drum 101 to face the photosensitive drum 101. The paper 112 is contained in a paper cassette 109 located on the front side (on the right side in FIG. 5) of the photosensitive drum 101. However, the paper can also be fed manually. A paper feed roller 110 is provided in an end portion of the paper cassette 109 to send the paper 112 contained in the paper cassette 109 into a carrier passage.

As described above, the paper 112 onto which an unfixed toner image has been transferred further is carried to a fixing device located at the back (on the left side in FIG. 5) of the photosensitive drum 101. The fixing device is composed of a fixing roller 113 having a fixing heater (not shown in the figure) therein and a pressure roller 114 provided to be in contact with the fixing roller 113 under pressure. The paper 112 carried from the transfer section is pressurized by the pressure-contact part between the fixing roller 113 and the pressure roller 114 while being heated. Thus, the unfixed toner image on the paper 112 is fixed. Further, a paper ejection roller 116 is provided behind the fixing roller 113 and allows the paper 112 with the fixed toner image to be ejected outside the image forming apparatus.

The printer controller 111 not only converts data as described before but also controls respective parts inside the image forming apparatus including the motor 115, a polygon motor inside the optical scanning unit, and the like, although this is not shown in FIG. 5.

According to the present invention, a wide-angle scanning optical system can be used and in addition, the scanning optical system can be disposed closely to the deflection means. Consequently, the present invention can provide an optical scanning apparatus which facilitates the reduction in size of the optical scanning apparatus as a whole and an image forming apparatus using the same.

Furthermore, the scanning optical elements can be disposed with higher precision with respect to rotational deviation caused parallel with the optical direction and that caused parallel to the sub-scanning direction.

What is claimed is:

1. An optical scanning apparatus, comprising:
light source means;
deflection means with a deflecting surface, said deflection means deflecting an incident light beam from said light source means by the deflecting surface;
a scanning optical system including at least one scanning optical element for leading the light beam deflected by said deflection means onto a surface to be scanned and forming an image as a spot on the surface to be scanned; and
synchronization detecting means for obtaining a scanning start position signal with respect to a main scanning direction on the surface to be scanned,
wherein a scanning optical element of said scanning optical system is provided with a light-beam passage for allowing a light beam traveling toward said synchronization detecting means to pass through, the light-beam passage being a notch portion provided in a part of an end of said scanning optical element.

2. An optical scanning apparatus according to claim 1, wherein said scanning optical element having the light-beam passage is disposed in a place closest to the deflection means.

3. An optical scanning apparatus according to claim 1, wherein an angle between a principal ray of part of the light beam deflected by said deflection means traveling toward an end within a scanning effective width on the surface to be scanned and a principal ray of part of the light beam deflected by said deflection means traveling toward said synchronization detecting means is set not to exceed 30°.

4. An optical scanning apparatus according to claim 1, wherein the incident light beam traveling toward said deflection means is incident on said deflection means from a direction oblique to an optical axis in a main scanning plane, and the light-beam passage for allowing a light beam traveling toward said synchronization detecting means to pass through is provided on a side opposite to said light source means in the main scanning direction with respect to the optical axis.

5. An optical scanning apparatus according to claim 1, wherein the light-beam passage for allowing a light beam traveling toward said synchronization detecting means to pass through is provided at one end in a longitudinal direction of said scanning optical element, and a light-beam passage for allowing a light beam traveling toward said deflection means to pass through is provided at the other end in the longitudinal direction of said scanning optical element.

6. An optical scanning apparatus according to claim 1, wherein said scanning optical element is a scanning lens.

7. An optical scanning apparatus according to claim 6, wherein said scanning lens is a molded lens made of a plastic material.

8. An optical scanning apparatus according to claim 7, wherein said scanning lens having the light-beam passage for allowing a light beam traveling toward said synchronization detecting means to pass through is formed by injection molding, the light-beam passage is formed at an end in the longitudinal direction of said scanning lens, and an injection port used during the injection molding is formed at the other end.

9. An optical scanning apparatus, comprising:

light source means;

deflection means with a deflecting surface, said deflection means deflecting an incident light beam from said light source means by the deflecting surface;

a scanning optical system including at least one scanning optical element for leading the light beam deflected by said deflection means onto a surface to be scanned and forming an image as a spot on the surface to be scanned; and synchronization detecting means for obtaining a scanning start position signal with respect to a main scanning direction on the surface to be scanned, wherein a scanning optical element of said scanning optical system is provided with a light-beam passage for allowing a light beam traveling toward said synchronization detecting means to pass through, wherein the light-beam passage is a non-filling portion where said scanning optical element is not filled, and wherein said scanning optical element is provided with a positioning reference at an end in a longitudinal direction of said scanning optical element, and the positioning reference is located within an area where the light-beam passage is present or on an outer side of the area with respect to an optical axis.

10. An optical scanning apparatus according to claim 9, wherein said scanning optical element is provided with a positioning reference at each of one end having the light-beam passage and the other end in a longitudinal direction of said scanning optical element, and the positioning reference at the one end having the light-beam passage is located within an area where the light-beam passage is present or on an outer side of the area with respect to an optical axis, in the longitudinal direction of said scanning optical element.

11. An optical scanning apparatus according to claim 9, wherein the positioning reference is provided on a surface of said scanning optical element at the deflection means side so as to position said scanning optical element with respect to a direction of the optical axis.

12. An optical scanning apparatus according to claim 9, wherein the positioning reference is provided on a surface substantially parallel to a cross section in the main scanning direction of said scanning optical element so as to position said scanning optical element with respect to a sub-scanning direction.

13. An optical scanning apparatus according to claim 9, wherein positioning references are arranged in a symmetrical form in a sub-scanning direction.

14. An optical scanning apparatus comprising:

light source means;

deflection means with a deflecting surface, said deflection means deflecting an incident light beam from said light source means by the deflecting surface;

a scanning optical system including a plurality of scanning optical elements for leading the light beam deflected by said deflection means onto a surface to be scanned and forming an image as a spot on the surface to be scanned; and synchronization detecting means for obtaining a scanning start position signal with respect to a main scanning direction on the surface to be scanned, wherein at least two scanning optical elements of said plurality of scanning optical elements are provided with a light-beam passage for allowing a light beam traveling toward said synchronization detecting means to pass through, and wherein said at least two scanning optical elements are disposed in a place closest to said deflection means.

15. An image forming apparatus, comprising:

an optical scanning apparatus according to any one of claims 1, 9 and 14;

a photosensitive member disposed on a surface to be scanned;

a developing device for developing an electrostatic latent image as a toner image, the electrostatic latent image being formed on the photosensitive member with a light beam scanned by the optical scanning apparatus;

a transfer device for transferring the toner image developed by the developing device onto a material onto which the toner image is to be transferred; and a fixing device for fixing the toner image transferred on the material onto the material.

16. An image forming apparatus, comprising:

an optical scanning apparatus according to any one of claims 1, 9 and 14; and a printer controller for converting code data input from an external device into an image signal and inputting the image signal to the optical scanning apparatus.

* * * * *

UNITED STATES PATENT AND TRADEMARK OFFICE
CERTIFICATE OF CORRECTION

PATENT NO. : 6,700,596 B2
DATED : March 2, 2004
INVENTOR(S) : Keiichiro Ishihara It is certified that error appears in the above-identified patent and that said Letters Patent is hereby corrected as shown below:

Column 8,
Line 8, "beam LED" should read -- beam LBD --.

Column 13,
Line 1, "Instance," should read -- instance, --; and
Line 9, "In" should read -- in --.

Signed and Sealed this

Thirteenth Day of July, 2004

JON W. DUDAS
*Acting Director of the United States Patent and Trademark Office*